Jan. 12, 1960           F. FRUENGEL           2,921,184
SYSTEM FOR SIGNALING BY LIGHT IMPULSES
Filed April 26, 1955
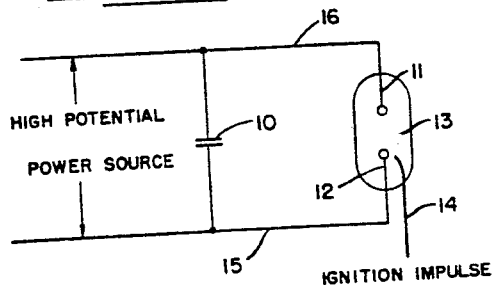
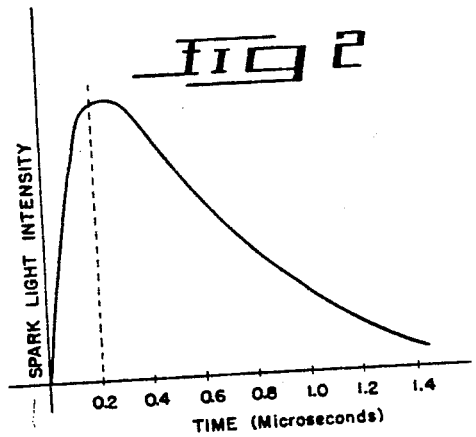
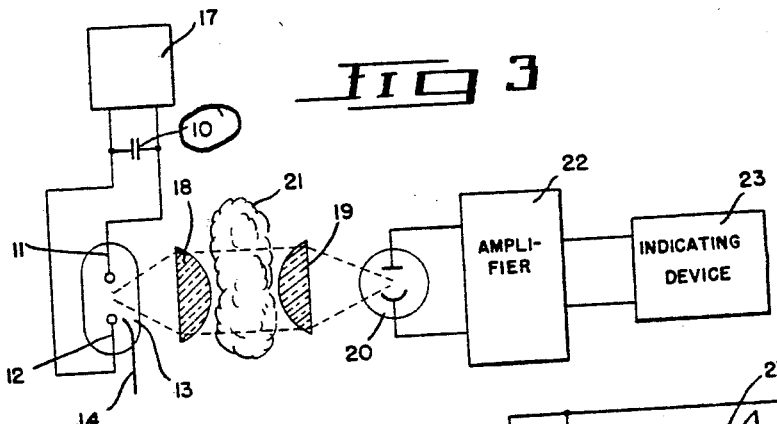
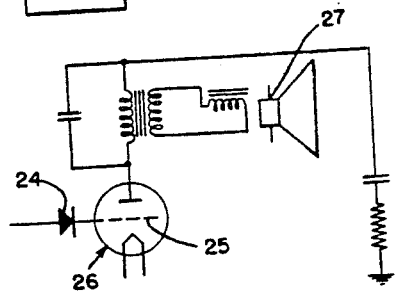
INVENTOR.
FRANK FRUENGEL
BY William H. Kuner

United States Patent Office 2,921,184
Patented Jan. 12, 1960

2,921,184

SYSTEM FOR SIGNALING BY LIGHT IMPULSES

Frank Fruengel, Hamburg-Rissen, Germany

Application April 26, 1955, Serial No. 503,996
In Germany February 9, 1950

Public Law 619, August 23, 1954
Patent expires February 9, 1970

8 Claims. (Cl. 250—7)

The present invention relates to an optical signaling system whereby optical signals can be transmitted through strongly light-absorbing media such as, for instance, fog, clouds, dust, mist, sand storms, water or the like.

The problem of signaling optically through very strongly absorbing media is often encountered when it becomes necessary to transmit optical signals under bad weather conditions, through atmospheric dust, fog, clouds, sand storms, and over distances beyond optical sight; and this problem arises also in the case of light-signaling under water, for instance, from diver to ship. The term "absorbing media" as applied throughout this specification and claims is intended to include all named obstructions to the free passage of light.

To achieve better penetrating strength of conventional light sources for such purpose, it has been tried to increase more and more the intensity of the light source at the transmitting end and to employ highly photosensitive devices at the receiving end. A considerable increase in the usefulness of such conventional light flash signaling methods could be gained by the introduction of modulated light as transillumination source and of A.-C. voltage amplifiers in connection with the photo-sensitive device as means for receiving and sensing the signals after they have penetrated the absorbing medium. With such improved prior means it was possible to transilluminate absorptions up to $10^8$, but impossible to achieve better results.

It is a primary object of the present invention to enhance the degree of transillumination of absorbing media by providing as light source an electric spark which, particularly developed for the purpose in view by intensive investigation, has a momentary luminous intensity ranging several powers of ten higher than other applicable light sources presently known.

In a search for achieving the object of this invention it has been discovered that in order to obtain such high light emission from an electric spark, usually derived from a condenser discharge, the inductance of the condenser discharge circuit must be extremely low, preferably so low that when considering the resistance of the developing spark itself as the substantial circuit resistance, the discharge circuit approaches the critical condition of an oscillatory series circuit of inductance, capacitance and resistance.

Another object of this invention is to provide a condenser discharge circuit having the low inductance necessary for producing sparks of momentarily highest luminous intensity.

Still another object of this invention is to provide a system for communication by spark light through strongly absorbing media in which one or several spark-light transmitters, as provided by this invention, are used in conjunction with one or several photo-electric receivers particularly adapted for the reception of spark light only.

For a better understanding of other features and advantages, some systems forming preferred examples of this invention, will now be described in greater detail in connection with the drawing wherein:

Fig. 1 represents a diagram of a spark discharge circuit as preferably used in practicing the present invention;

Fig. 2 is a diagrammatic representation of spark-light intensity plotted against time;

Fig. 3 shows diagrammatically a system as provided by this invention for signaling by spark light through absorbing media;

Fig. 4 shows diagrammatically a modified receiver giving audible loudspeaker signals in response to spark light; and Fig. 5 shows diagrammatically an arrangement for synchronizing devices at the transmitting end with such at the receiving end for the purpose of measuring the distance therebetween.

Referring to Fig. 1 of the drawing, there is indicated the condenser 10 assumed to be continually charged from a high-potential, direct-current source (not shown). The condenser is connected to the main electrodes 11 and 12 which are arranged within a discharge chamber 13. An ignition electrode 14, which may be in the form of a pin arranged adjacent to a main electrode, as shown, or which may completely surround the main electrode, serves for tripping discharges whenever high-voltage pulses are imposed on it. The source of such high voltage pulses, not shown, may be of any well known type. Of primary importance for maximum spark light intensity is that the connections 15 and 16 between condenser 10, and the electrodes 11 and 12, forming parts of the discharge circuit, have very low inductance. In order to understand fully the importance of proper parameters in the discharge circuit, a short mathematical computation is now to follow:

In accordance with the teachings of Toepler, the resistance of an electric spark can be expressed by the formula:

$$R_s = \frac{k \times l \times p}{C \times V}$$

where $k$ is the Toepler spark constant ranging in the order of $0.2 \times 10^{-3}$ for spark-overs in rare gases, $l$ is the length of the spark in centimeters, $p$ is the pressure within the discharge chamber in atmospheres above atmospheric pressure, $C$ is the capacitance of the condenser in farads, and $V$ is the charging voltage of the condenser.

The spark resistance as computed by the Toepler formula is in the present instance considered as the load resistance in an electrical RLC series circuit including besides the resistance R the inductance L, and the capacitance C. The resistance R, represented substantially by the spark resistance $R_s$ in the present case is the damping constant of the circuit. Critical damping of the condenser discharge in such a circuit will take place when $$R_s = \sqrt{\frac{4L}{C}}$$

It will be remembered that critical discharge condition or the critical case of such a circuit gives rise to the fastest conversion of potential energy into another form of energy. Thus the spark will instantaneously consume a maximum of energy when it represents the critical resistance in a critically damped series discharge circuit. Inserting in above formula for $R_s$ the factors as given by Toepler results in the equation $$\frac{k \times l \times p}{C \times V} = \sqrt{\frac{4L}{C}}$$

In a practical example of this invention the following values and constants were chosen for a discharge circuit: The spark gap length $l = 1$ cm., the pressure $p = 6$ atmospheres above atmospheric pressure, the capacitance of the condenser $C = 0.1 \times 10^{-6}$ farad, and the voltage at which the condenser was charged $V=10^4$ volts. Solving the equation for inductance L and inserting these numerical values gives $$L=\frac{k^2\times l^2\times p^2}{4C\times V^2}=\frac{0.04\times 10^{-6}\times 6^2}{4\times 0.1\times 10^{-6}\times 10^8}=0.036\times 10^{-6} \text{ henry}$$

With a discharge circuit having above constants and a spark gap arranged in a vessel containing a gaseous filling of the pressure given, it was possible to obtain instantaneous peak luminous intensities of more than $10^8$ candle powers per square centimeter. The electric spark has in this case a diameter of a few millimeters and a length of 10 millimeters making it possible to entirely illuminate a parabolic mirror having a diameter of 35 centimeters. In connection with an effective reflecting area of 1000 square centimeters, the momentary searchlight brightness was $10^{11}$ candle powers. The intensity-time relationship of such bright sparks is represented in Fig. 2 where relative luminous intensity is plotted against time.

In order to obtain the very low inductance of $0.036\times 10^{-6}$ henry as afore-mentioned, it becomes necessary to utilize a condenser of extremely low inductance. Moreover, the leads to the electrodes must be so constructed that they also have extremely low inductance. For this purpose the invention provides that one terminal of the condenser is directly connected to one electrode of the discharge vessel whereas the other terminal is connected to the other electrode by way of a conductor system surrounding in cagelike manner the condenser and the discharge vessel. Such a cagelike structure has the advantage that it presents no obstruction to the emanating light, but lends to the current flow a similar character as a concentric conductor system. In simple cases it suffices to utilize the equally spaced mounting bolts of the discharge vessel as cagelike current conducting means. Rare gases render already at atmospheric pressure high light yield of spark discharges, but according to measurements by the inventor the maximum of luminous density at the instant of highest light emission increases in linear proportion with the pressure of the gas filling. In practicing this invention it is therefore advisable to apply a pressure somewhat above atmospheric pressure for the rare-gas filling of the impulse light source. As repeatedly mentioned before, it is only then possible to approach the critical case in the condenser discharge circuit when the inductance of this circuit is kept extremely low, for instance, 0.036 microhenry as in the example given. In order to reach the object of this invention it is therefore advisable to make the inductance of the whole discharge circuit lower than $10^{-7}$ henry.

In order to be able to take full advantage of the features of the present impulse lamp, a suitable receiver must be employed. A receiver having a high vacuum phototube or a photo-electric multiplier is to be preferred. Such receiver is capable of converting the incident radiant impulses into similarly effective electric impulses. In accordance with this invention the receiver preferably incorporates a resistance amplifier whose bandwidth has been chosen to utilize fully all harmonics resulting from a Fourier analysis of the curve shown in Fig. 2 and having an amplitude greater than 0.1 of the maximum amplitude. For a curve as plotted in Fig. 2 a bandwidth covering the range from 0.1 to 2 megacycles per second is necessary, but for signalling over shorter distances, narrower bandwidths give sufficient response.

With means presently known the upper limit of increasing signal strength has been reached when employing a photo-multiplier having a magnifying factor of $10^4$ and a resistance amplifier having an amplifying factor of $10^4$ and a bandwidth covering a range from 0.1 to 2 megacycles per second. Attempts to further enhance signal strength, whether by multiplier or amplifier, have been unsuccessful since signal and noise level of the arrangement rise then in equal proportion. For perception of the signals well-known indicating or acoustical devices in connection with relaxation circuits, thyratrons, or oscillator tubes can be employed.

By means of the afore-described arrangement, that is, the particularly developed spark light source at the transmitting end, and a photo-sensitive device of suitable spectral sensitivity range combined with an amplifier adapted in bandwidth and wave form sensitivity to the characteristics of spark light impulses at the receiving end, transillumination of absorptions up to $10^{15}$ can be achieved. A further increase of the efficacy is attainable by employing a phototube having a photo cathode with maximum sensitivity in the spectral range in which the maximum impulse radiation of the condenser discharge lamp with respect to its gas filling lies. When argon is the filling of the discharge vessel, the radiation maximum lies, according to experimental investigation, in the spectral range between wavelengths of 0.450 and 0.350 micron. In this range the antimony-caesium photo cathode yields best quanta gain. Since argon is a very suitable filling, phototubes with antimony-caesium cathodes are preferable to be used for the reception of this spark light.

An arrangement for practical application of the invention for the purpose of communication is diagrammatically illustrated in Fig. 3. The spark light source comprising the electrodes 11, 12 in chamber 13, trigger electrode 14, storage condenser 10 and power source 17, is indicated at the left of the figure. The spark light emanating from this source whenever a spark-over is caused by triggering of electrode 14, or an over-potential of condenser 10, is focused by lens 18 in a desired direction toward the receiving end of the system. At the receiving end, the light flash signals impinging on lens 19 are concentrated on the photo-cathode of phototube 20. The spark light traveling between transmitter and receiver lenses 18 and 19 respectively transilluminates an absorbing medium indicated at 21 in the form of fog or a cloud. The phototube 20, converting the light impulses into voltage impulses, is connected to an electronic amplifier 22 covering a restricted frequency bandwidth including only frequencies resulting from spark light conversion. The amplified voltage impulses are introduced into a registering or indicating device shown at 23. This device can be actuated by the amplified voltage impulses in any known manner such as imparting the impulses to a control electrode for firing a thyratron, triggering a relay, energizing a relaxation oscillator or, particularly, energizing the electrodes of an image converter.

A modified method for rendering the signals audible is depicted in Fig. 4. Here the amplified voltage impulses are imposed by way of a rectifier 24 on the control grid 25 of an input tube 26 of an audible-frequency generator which is coupled to a loudspeaker 27 for delivering audible signals whenever impulses are received.

It will be understood that, particularly when shorter distances are involved and focusing is not necessary, it is possible to communicate a message from one transmitter to several receivers or to reach one receiver from several transmitters. Thus the system provided by this invention can involve a plurality of transmitters and receivers.

It has been found that it is often desirable, for example, in order to check the travel time of light or to measure distances on the basis of light speed, to release by the action of the electric spark in the impulse light source some recording means. For this purpose, auxiliary pulses for operating oscillators or other recording means, such as photoelectric means for converting spark light impulses into electric energy impulses, multipliers or the like, can be derived by electrically coupling these means to a current-carrying element of the transmitting impulse light source, whereby automatic synchronization between transmitting and receiving end can be established. Such an arrangement is depicted in Fig. 5 where the line for carrying the auxiliary pulse is coupled to the lead of electrode 12 at 28. A pulse delaying device 29 is inserted in the line leading to the synchronized recording device 30 located at the receiving end. Such delaying device serves for accurate timing of the impulse in case this is of importance.

The loop or coil indicated at 28 in Fig. 5 is of the type suitable for deriving auxiliary pulses from a portion of the magnetic field encircling the leads of the condenser discharge circuit of the light source whenever a discharge impulse passes. When such linking or coupling, as well known in the art, is established, a voltage pulse is induced in coil 28 whenever a discharge occurs through the discharge circuit of condenser 10 including the spark gap electrodes 11, 12 and leads 15, 16. This voltage pulse reaches its peak during the instant of steep rise of the condenser discharge current, which is the instant of the optimum spark-over through the spark gap. The voltage pulse thus induced in coil 28 is carried to the delay device 29 and becomes here effective in producing an output impulse after a time delay determined in device 29. The recording device indicated at 30 and being the counterpart of the indicating device 23 in the embodiment shown by Fig. 3, can be of any known type such as an oscillator, multiplier, photo-electric means for converting spark-light impulses into electric energy impulses or the like. In connection with such photo-electric means, the function of the system is as follows: The lamp 13 radiates a spark-light flash as described with reference to Fig. 3, and if it is desirable to measure the distance between the transmitter lens 18 and receiver lens 19, the delay device 29 is timed so as to obtain synchronization of the voltage impulse delayed by the device 29 and transmitted to the device 30, on one hand, and the spark-light impulse received by the device 30 (as described for the receiver 19—23 in Fig. 3), on the other hand. By properly timing the delay device 29 to a time interval corresponding to the travel of light over the unknown distance, so as to obtain said synchronization, the unknown distance between transmitter and receiver is determined in terms of said delay time versus the speed of light.

It is to be understood that the embodiments shown and described are preferred examples only and that modifications will occur to those skilled in the art which rightfully fall within the scope of this invention as claimed.

What is claimed is:

1. A system for transmitting light signals through absorbing media by spark light impulses comprising at least one spark light transmitter including a storage condenser, means for charging said condenser, a discharge circuit of low inductance for said condenser including spark gap means and means associated with said discharge circuit for causing discharges of said condenser through said spark gap means in the form of electric sparks; at least one receiver positioned to receive said spark light and including photoelectric means for converting light impulses into electric energy impulses, a frequency band amplifier associated with said photoelectric means and tuned to amplify substantially all harmonics of a spark light intensity wave, an output circuit connected to said amplifier including an indicating device for giving perceptible signals.

2. A system as claimed in claim 1 wherein said spark gap means is in the form of a pair of spaced electrodes enclosed in a gas-filled discharge chamber.

3. A system as claimed in claim 1 wherein the inductance of said discharge circuit including spark gap means is low enough to approach the critically damped condition in said circuit with the spark itself representing the damping resistance.

4. A system as claimed in claim 1 wherein the inductance of said discharge circuit is lower than $10^{-7}$ henry.

5. A system as claimed in claim 1 wherein said frequency band amplifier is tuned for a frequency bandwidth in the range between 0.1 and 2 megacycles per second.

6. A system as claimed in claim 1 wherein said photoelectric means include a high-vacuum phototube having an antimony-caesium cathode with maximum sensitivity in the spectral range between wavelengths of 0.450 and 0.350 micron.

7. A system for transmitting signals by spark light impulses comprising at least one spark light transmitter including a storage condenser, means for charging said condenser, a discharge circuit of extremely low inductance for said condenser including spark gap means and means associated with said discharge circuit for causing discharges of said condenser through said spark gap means in the form of electric sparks, at least one receiver positioned to receive the light produced by said sparks and including photoelectric means for converting light impulses into electric energy impulses, a frequency band amplifier associated with said photoelectric means and tuned to amplify substantially the useful harmonics of a spark light intensity wave, an indicating device connected to said amplifier for translating the amplified electric energy impulses into perceptible signals.

8. A system as defined in claim 7, wherein said indicating device includes a rectifier and an audible-frequency generator having an input tube with a control grid, said generator becoming operative when a rectified impulse of electric energy from said amplifier through said rectifier is imposed on said control grid, and a loudspeaker connected to the output side of said generator rendering audible signals when said generator becomes operative.

References Cited in the file of this patent

UNITED STATES PATENTS

| | | |
|---|---|---|
| 1,640,966 | Seguin et al. | Aug. 30, 1927 |
| 1,985,683 | Nicolson | Dec. 25, 1934 |
| 2,032,588 | Miller | Mar. 3, 1936 |
| 2,227,906 | Kellogg | Jan. 7, 1941 |
| 2,234,329 | Wolff | Mar. 11, 1941 |
| 2,304,998 | Gillespie | Dec. 15, 1942 |
| 2,378,944 | Ohl | June 26, 1945 |
| 2,389,649 | Stark et al. | Nov. 27, 1945 |
| 2,403,527 | Hershberger | July 9, 1946 |
| 2,404,696 | Deal | July 23, 1946 |
| 2,423,254 | Rettinger | July 1, 1947 |
| 2,492,247 | Weaving et al. | Dec. 27, 1949 |

FOREIGN PATENTS

| | | |
|---|---|---|
| 732,360 | Great Britain | June 22, 1955 |
| 378,270 | Italy | Jan. 27, 1940 |

OTHER REFERENCES

Surveying With Pulsed-Light Radar by Hansen Electronics, July 1948, pages 76–79.

Surveying With the Velocity of Light by Compton Surveying and Mapping, July–September 1954, pages 283–292.